(12) United States Patent
Pedersen et al.

(10) Patent No.: US 10,539,989 B1
(45) Date of Patent: Jan. 21, 2020

(54) MEMORY DEVICE ALERT OF COMPLETION OF INTERNALLY SELF-TIMED POWER-UP AND RESET OPERATIONS

(71) Applicant: Adesto Technologies Corporation, Santa Clara, CA (US)

(72) Inventors: Bard M. Pedersen, Fremont, CA (US); Paul Hill, Eastleigh (GB)

(73) Assignee: Adesto Technologies Corporation, Santa Clara, CA (US)

( * ) Notice: Subject to any disclaimer, the term of this patent is extended or adjusted under 35 U.S.C. 154(b) by 43 days.

(21) Appl. No.: 15/458,122

(22) Filed: Mar. 14, 2017

Related U.S. Application Data

(60) Provisional application No. 62/308,669, filed on Mar. 15, 2016.

(51) Int. Cl.
*G06F 1/24* (2006.01)
*G06F 1/3234* (2019.01)

(52) U.S. Cl.
CPC .............. *G06F 1/24* (2013.01); *G06F 1/3275* (2013.01)

(58) Field of Classification Search
CPC ................................. G06F 1/24; G06F 1/3275
See application file for complete search history.

(56) References Cited

U.S. PATENT DOCUMENTS

| | | | |
|---|---|---|---|
| 6,298,386 B1 | 10/2001 | Vahalia et al. | |
| 6,484,218 B1 | 11/2002 | Pipho | |
| 8,429,329 B2 | 4/2013 | Pekny et al. | |
| 8,554,968 B1 | 10/2013 | Onufryk et al. | |
| 8,806,115 B1 | 8/2014 | Patel et al. | |
| 9,037,890 B2 | 5/2015 | De Caro et al. | |
| 2002/0032823 A1 | 3/2002 | Scardamalia et al. | |
| 2005/0060479 A1 | 3/2005 | Deng et al. | |
| 2007/0067520 A1* | 3/2007 | Maddali | G06F 13/1694 710/104 |
| 2009/0089492 A1 | 4/2009 | Yoon et al. | |
| 2009/0259789 A1 | 10/2009 | Kato et al. | |
| 2011/0161568 A1 | 6/2011 | Bruce et al. | |
| 2011/0179229 A1 | 7/2011 | Chen et al. | |
| 2012/0246392 A1 | 9/2012 | Cheon | |
| 2013/0339638 A1 | 12/2013 | Lazmi et al. | |
| 2017/0161216 A1 | 6/2017 | Hill | |

OTHER PUBLICATIONS

ATMEL, AT30TSE752A, AT30TSE754A, AT30TSE758A Datasheet, 2014, ATMEL (Year: 2014).*
ATMEL, AT26DF081A Datasheet, 2009, ATMEL (Year: 2009).*

* cited by examiner

*Primary Examiner* — Austin Hicks
(74) *Attorney, Agent, or Firm* — Michael C. Stephens, Jr.

(57) ABSTRACT

A memory device can include: a non-volatile storage register configured to store an active reset polling enable bit that corresponds to a reset operation; a controller configured to control execution of the reset operation on the memory device; an operation completion indicator configured to provide a reset recovery indication external to the memory device when the reset operation has completed and the active reset polling enable bit is set; and a command decoder configured to receive a command to be executed on the memory device in response to the reset recovery indication.

20 Claims, 11 Drawing Sheets

MEMORY DEVICE ALERT OF COMPLETION OF INTERNALLY SELF-TIMED POWER-UP AND RESET OPERATIONS

RELATED APPLICATIONS

This application claims the benefit of U.S. Provisional Application No. 62/308,669, filed Mar. 15, 2016, and which is incorporated herein by reference in its entirety.

FIELD OF THE INVENTION

The present invention generally relates to the field of semiconductor devices. More specifically, embodiments of the present invention pertain to power control modes and statuses of memory devices.

BACKGROUND

Memory devices can employ various modes whereby certain circuitry is disabled in order to reduce the power consumption of the device. In many portable, battery-powered applications, power consumption is particularly important. Examples of such applications may include cellular phones, pagers, camera recorders, and laptops. These applications/devices typically demand the lowest power consumption possible in order to prolong battery life and to accommodate the use of smaller, lower capacity batteries in order to reduce the device size, cost, and weight.

DETAILED DESCRIPTION OF EMBODIMENTS

Figure 1:
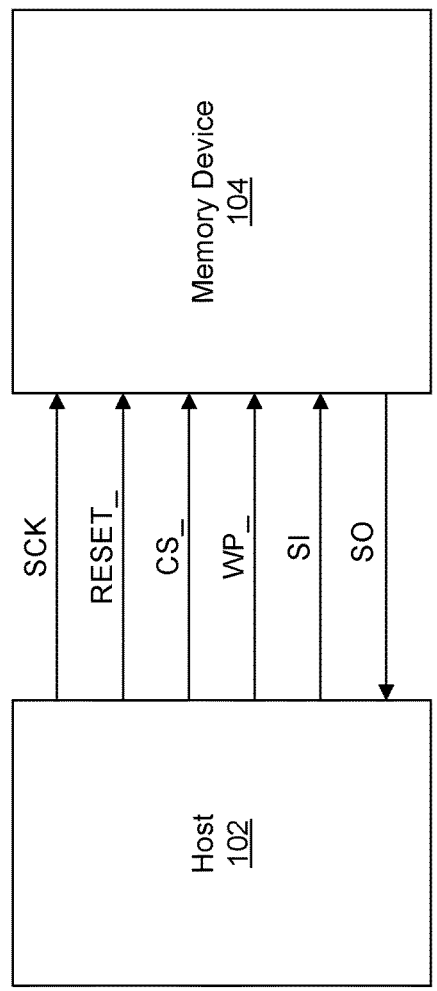
FIG. 1 is a schematic block diagram of an example host and memory device arrangement, in accordance with embodiments of the present invention.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device, and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Particular embodiments may be directed to memory devices, including volatile (e.g., SRAM, DRAM, etc.) or non-volatile memory (NVM) devices, such as flash memory, R-RAM, M-RAM, E2ROM, and CBRAM, to name a few. Particular embodiments can include structures and methods of operating flash and/or resistive switching memories that can be written (programmed/erased) between one or more resistance and/or capacitive states. In one example, a CBRAM storage element may be configured such that when a forward or reverse bias greater than a threshold voltage is applied across electrodes of the CBRAM storage element, the electrical properties (e.g., resistance) of the CBRAM storage element can change. A write operation may be any operation on a memory (e.g., NVM) device that is intended to change a state of at least one of the memory locations on the device. Further, write operations can include program operations (e.g., to change a data state from 1 to 0) and erase operations (e.g., to change a data state from 0 to 1). Of course, the data states and/or resistance levels of the storage element can be predefined in any suitable way; however, the write operation can generally involve ensuring that a memory cell is put into or remains in the desired state. In any event, certain embodiments are suitable to any type of memory device, including both volatile and non-volatile types/devices, and that may include resistive switching memory devices.

In one embodiment, a memory device can include: (i) a non-volatile storage register configured to store an active reset polling enable bit that corresponds to a reset operation; (ii) a controller configured to control execution of the reset operation on the memory device; (iii) an operation completion indicator configured to provide a reset recovery indication external to the memory device when the reset operation has completed and the active reset polling enable bit is set; and (iv) a command decoder configured to receive a command to be executed on the memory device in response to the reset recovery indication.

Referring now to FIG. 1, shown is a schematic block diagram 100 of an example host and memory device arrangement, in accordance with embodiments of the present invention. In this example, host 102 can interface with memory device 104 via a serial interface. For example, host 102 can be any suitable controller (e.g., CPU, MCU, general-purpose processor, GPU, DSP, etc.), and memory device 404 can be any type of memory device (e.g., SRAM, DRAM, EEPROM, Flash, CBRAM, magnetic RAM, ReRAM, etc.). Memory device 104 can thus be implemented in a variety of memory technologies, such as non-volatile types. In some cases, memory device 104 can be a serial flash memory that may be implemented in more traditional types of non-volatile memories, or in CBRAM/ReRAM resistive switching memories.

Various interface signals, such as in a serial peripheral interface (SPI) interface, can be included for communication between host 102 and memory device 104. In this example Single SPI configuration/mode, serial clock (SCK) can provide a clock to device 104, and may be used to control the flow of data to and from the device. Command, address, and input data (e.g., on the SI pin) can be latched on a rising edge of SCK, while output data (e.g., on the SO pin or via I/O pins) can be clocked out on a falling edge of SCK, or by a data strobe in some arrangements. The reset pin (RESET_) can be used to terminate an operation in progress, and to reset an internal state machine of memory device 104 (e.g., to an idle state). Memory device 104 can remain in the reset condition as long as a low level is present on the reset pin. Also, because memory device 104 can include power-on reset circuitry, there may be no restrictions on the reset pin during power-on sequences. In some other implementations, memory device 104 may not include the reset pin (RESET_), and may instead include a hold pin (HOLD_).

Chip select (CS_) can be utilized to select memory device 104, such as from among a plurality of such memory devices, or otherwise as a way to access the device. When the chip select signal is de-asserted (e.g., at a high level), memory device 104 will also be deselected, and may be placed in a standby mode. Activating the chip select signal (e.g., via a high to low transition on CS_) may be utilized to start an operation, and returning the chip select signal to a high state can be utilized for terminating an operation. For internally self-timed operations (e.g., a program or erase cycles), memory device 104 may not enter standby mode until completion of the particular ongoing operation if chip select is de-asserted during the operation. Write protect (WP_) can be utilized for protection of sectors specified by a register (e.g., the sector protection register). For example, such sectors may be protected against program and erase operations. Thus, if a program or erase command is issued to memory device 104 while the write protect pin is asserted, the device may ignore the command and perform no operation.

In this example SPI interface, which may be a "single SPI mode," data can be provided to memory device 104 via a serial input (SI) signal. The serial input can be utilized for data input including command and address sequences. For example, data on the serial input pin can be latched on a rising edge of SCK, and data on the serial input pin can be ignored if the device is deselected (e.g., when the chip select signal is de-asserted). Data can be output from memory device 104 via a serial output (SO) signal. For example, data on the serial output can be clocked out on falling edges of SCK, and the serial output signal can be in a high impedance state when the device is deselected (e.g., when the chip select signal is de-asserted). In particular embodiments, memory device 104 may support a variety of SPI modes or configurations, such as single SPI, QPI, and octal modes. Further, the interface mode of memory device 104 can be changed to the single SPI mode, regardless of the present interface mode, in response to a write command in which automatic entry into a power down mode results after completion thereof.

Memory device 104 can include a voltage regulator with an output that provides a voltage supply for various other components of the memory device, including a command user interface. The memory device may be placed into an ultra-deep power-down (UDPD) mode by providing (e.g., from host 102) a predetermined command over the interface to the memory device. The UDPD mode can cause the output of the voltage regulator, along with appropriate generations circuitry therein, to be disabled. In order to bring memory device 104 out of the ultra-deep power-down mode, a wake-up signal or other command may be provided to the memory device, which can include a wake-up circuit that remains powered on even when the memory device is in the ultra-deep power-down mode. Receipt of the wake-up signal or command while the memory device is in the ultra-deep power-down mode can cause the output of the voltage regulator and associated circuitry to be enabled, thereby providing power to the components that were previously powered down.

As described herein, a "reset operation" on memory device 104 can include any of the following operations: a power-up or power/VCC cycling operation, a hardware reset command sequence (see, e.g., FIG. 4), a hardware reset pin assertion (see, e.g., FIG. 5), and a predetermined SPI command (see, e.g., FIG. 7), and may include exiting from ultra-deep power-down mode, and exiting from deep power-down mode. For example, the predetermined SPI command may be a type of software reset, which may also control exiting from the deep power-down mode or the ultra-deep power-down mode. In particular embodiments, memory device 104 may notify host 102 when any such reset operation has completed such that the memory device is able to accept normal commands (e.g., read commands, program/erase commands, etc.).

Figure 2:
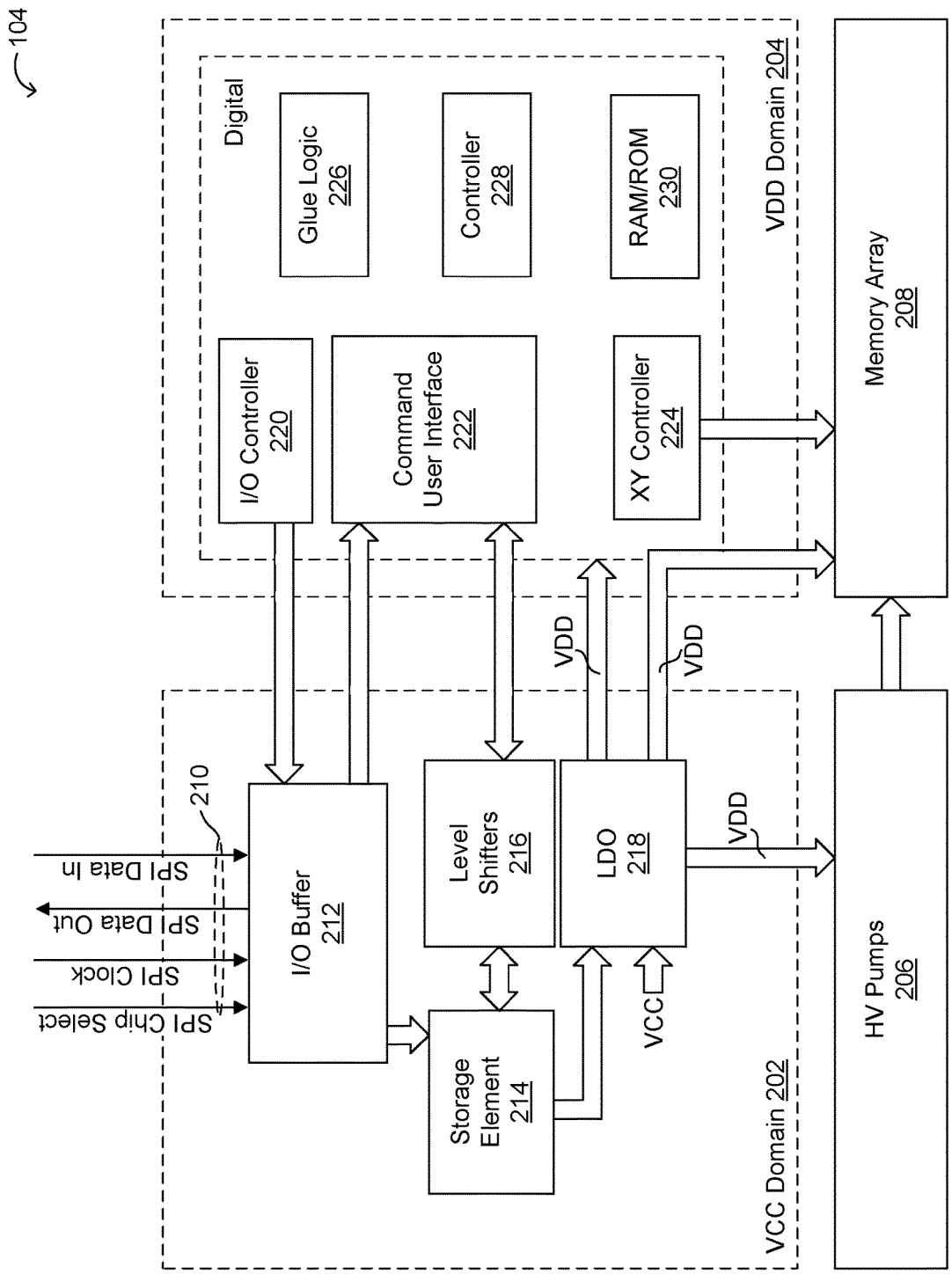
FIG. 2 is a schematic block diagram of various example data processing units in a memory device, in accordance with embodiments of the present invention.

Referring now to FIG. 2, shown is a schematic block diagram of various example data processing units in a memory device, in accordance with embodiments of the present invention. In general, memory device 104 can include VCC domain blocks (e.g., functional blocks or circuits that are powered by and operate using VCC power) 202, VDD domain blocks (e.g., functional blocks or circuits that are powered by and operated using a reduced or different power level VDD) 204, high voltage (HV) charge pumps 206, and memory array 208. The memory device 104 itself can be powered by an external VCC power supply, and can include low drop-out (LDO) regulator 218 having an output that serves as an internal on-chip voltage supply to provide the VDD voltage level to VDD domain blocks 204, high voltage charge pumps 206, and memory array 208. Accordingly, VDD domain blocks 204, high voltage charge pumps 206, and memory array 208 may be powered by LDO regulator 218.

In this particular example, VCC domain blocks 202 may also include input/output buffer 212, level shifters 216, and storage element 214. For example, storage element 214 (e.g., latch, flip-flop circuit, etc.) can store the enabled/disabled state of LDO regulator 218. In addition, VDD domain blocks 204 can include various digital circuits, such as controller 228, input/output (I/O) controller 220, memory 230 (e.g., RAM and/or ROM), command user interface (CUI) 222, glue logic 226 in order to interface between other logic units, and XY controller 224 that interfaces with memory array 208. Level shifters 216 may be digital transfer devices that convert signals between the VCC and VDD supply domains. In some cases, the VCC domain may operate with 2.5 volts, whereas the VDD domain may operate with 1.8 volts, but these voltages may differ in other implementations.

Operation of memory device 104 can be controlled by instructions from host processor 102. In this particular example, a valid instruction starts with the falling edge of the CS_ signal, followed by an 8-bit operation code (opcode) along with the buffer or main memory address location. In some cases, memory device 104 can store program code, which may be copied into external RAM or RAM embedded in host processor 102 after power up of the given application. If memory device 104 does not need to be accessed until the next power cycle, it may be desirable to place memory device 104 into as low a power mode as possible so as to consume the least amount of current. There also may be other situations in which it is desirable to place memory device 104 into such a power-down mode.

The ultra-deep power-down mode can completely turn off the components of memory device 104 that operate in the VDD domain (e.g., 204). Further, various approaches for exiting memory device 104 from the ultra-deep power-down mode can be supported in certain embodiments. For example, the "reset operations" noted above, including a hardware reset command sequence (see, e.g., FIG. 4), hardware reset pin assertion (see, e.g., FIG. 5), a power/VCC cycling, and a predetermined SPI command (see, e.g., FIG. 7), may be supported such that either one of these results in memory device 104 exiting from the ultra-deep power-down mode, or the deep power-down mode.

Entering the ultra-deep power-down mode can be accomplished by providing a unique predetermined 8-bit command opcode from host processor 102 to I/O buffer 212 over the SPI bus 210. After receiving the unique command opcode, buffer 212 may pass the unique command opcode to command user interface 222. Command user interface 222 can then pass the opcode to level shifter 216 that is associated with decoding the command. Level shifter 216 can convert the opcode to the appropriate VCC domain voltage level, and may transfer the opcode to storage element 214 (e.g., a flip-flop circuit). Storage element 214 may then generate a signal to cause the output of LDO regulator 218 to be disabled. Disabling the output of LDO regulator 218 can power off VDD domain blocks 204 of memory device 212, as well as memory array 208, and high voltage charge pumps 206. Thus, in the ultra-deep power-down mode, all components that normally are powered by the VDD voltage supply can be completely powered down. By shutting down additional internal circuitry in memory device 104, the ultra-deep power-down mode can allow memory device 104 to consume less power as compared to other low power or standby modes.

Since almost all active circuitry is shut down in the ultra-deep power-down mode to conserve power, input/output controller 220 and command user interface 222 can be completely powered down during the ultra-deep power-down mode. Since any additional data clocked into memory device 104 after the memory device enters the ultra-deep power-down mode (and before it exits that mode) may be ignored, all subsequent commands may also be ignored until the device exits the ultra-deep power-down mode. On the other hand, as all such commands may be ignored, the ultra-deep power-down mode can be used as an extra protection mechanism against program and erase operations. However, as will be discussed in more detail below, all such subsequent commands may not be ignored, and predetermined certain command(s) may be accepted, such as the one shown below in FIG. 7 that provides a way to exit the ultra-deep power-down mode. When memory device 104 is in the ultra-deep power-down mode, the device can continue to be powered by the VCC voltage, such that VCC domain blocks 202 (including storage element 214, LDO regulator 218, and I/O buffers 212) may remain connected to the VCC voltage.

The ultra-deep power-down mode can allow the device to further reduce its energy consumption as compared to the existing standby and deep power-down modes by shutting down additional internal circuitry. In "regular" deep power-down modes, as opposed to an ultra-deep power-down mode, LDO 218 may remain on, or otherwise the power to the memory array and other circuitry can remain on in cases where there is no LDO. In contrast, LDO 218 is turned off during the ultra-deep power-down mode in order to completely turn off all of the circuitry using the output thereof, including circuits in VDD domain 204, HV pumps 216, and memory array 208.

Figure 3:
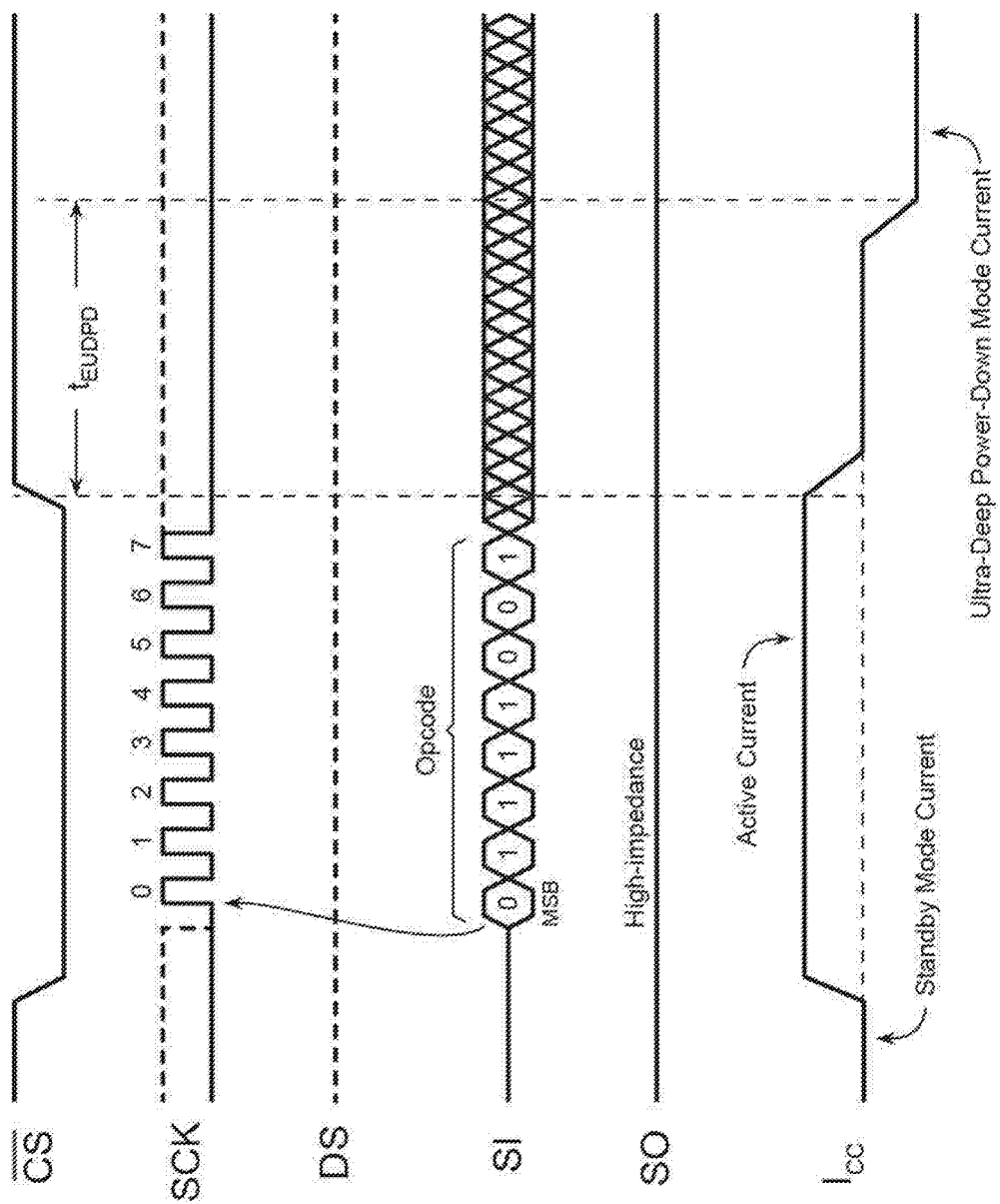
FIG. 3 is a waveform diagram of an example operation of entering ultra-deep power-down mode, in accordance with embodiments of the present invention.

Referring now to FIG. 3, shown is a waveform diagram 300 of an example operation of entering ultra-deep power-down mode, in accordance with embodiments of the present invention. Entering the ultra-deep power-down mode may be accomplished by simply asserting the CS_ pin, clocking in the opcode (e.g., 79h), and then de-asserting the CS_ pin. Any additional data clocked into the device after the opcode may be ignored. When the CS_ pin is de-asserted, the memory device may enter the ultra-deep power-down mode within the maximum time of $t_{EUDPD}$. For example, the complete opcode must be clocked in before the CS_ pin is de-asserted; otherwise, the device may abort the operation and return to the standby mode once the CS_ pin is de-asserted. In addition, the device may default to the standby mode after a power cycle. The ultra-deep power-down command may be ignored if an internally self-timed operation, such as a program or erase cycle, is in progress.

In some cases, all input pins may have to be at valid CMOS levels in order to minimize power consumption in the ultra-deep power-down mode. Upon recovery/exit from ultra-deep power-down, many internal registers (e.g., except the write completion status bit in a status/control register) may be at the power-on default state. In addition, memory device 104 may wake up in single SPI mode even if it was in QPI or octal mode, including double or multiple data rates, when it entered ultra-deep power-down. In some implementations, the ultra-deep power-down entry command may be ignored if an internally self-timed operation (e.g., a program or erase cycle) is in progress. As noted above, I/O controller 220 and command user interface 222 may be completely powered down during the ultra-deep power-down mode. As such, typically all opcode commands may be ignored by memory device 104 when the device is in the ultra-deep power-down mode. However, certain embodiments may support a predetermined opcode command sent over the SPI data in line of SPI bus 210 that may be used to bring memory device 104 out of the ultra-deep power-down mode (see, e.g., FIG. 7).

In one example, in order to wake memory device 104 and bring it out of the ultra-deep power-down mode, merely toggling the signal on the SPI CS_ line of SPI bus 210 will not be effective. Rather, a predetermined opcode (e.g., ABh) may be provided and decoded via dedicated circuitry in I/O buffer 212 and storage element 214. When memory device 104 is in the ultra-deep power-down mode, buffer 212 may clock in and pass the serial input signals directly to storage element 214, which can generate a signal to cause the output of LDO regulator 218 to be enabled in the event of a match of the predetermined opcode. Enabling the output of LDO regulator 218 can provide the VDD voltage to the various VDD domain blocks 204, as well as to high voltage charge pumps 206 and memory array 208, thus restoring memory device 104 to the standby mode. Thus, although memory device 104 is placed into the ultra-deep power-down mode using a certain command (e.g., the opcode), the memory device can be brought out of the ultra-deep power-down mode using appropriate hardware features of memory device 104, or a different command/opcode.

In some cases, a wake-up from ultra-deep power-down command may be the same as an existing command that is utilized for wake-up from a standard (not quite ultra-deep) power down mode. In other cases, a different wake-up from ultra-deep power-down command can be employed. The wake-up from power down command or "resume from deep power-down" command can be a standard SPI command, following a normal SPI command sequence. This may be as opposed to an exit ultra-deep power-down or hardware reset command sequence (e.g., JEDEC hardware reset) that can act as a substitute for a hardware reset pin. Such a hardware reset command can include a sequence of signals that should never occur during normal SPI operation. As such, the hardware reset command along these lines can be employed as another alternative to wake-up/exit from ultra-deep power-down mode.

To exit from the ultra-deep power-down mode, particular embodiments may support a hardware reset command sequence, exercising the hardware RESET_ pin, a power cycling (e.g., of main power supply VCC), or a dedicated/predetermined SPI command that may be the only recognizable command by the memory device when in ultra-deep power-down. Upon recovery from ultra-deep power-down, all internal volatile registers may be at their power-on default state. One exception can be a write completion status bit in a status/control register whereby even though such a status bit may be a volatile bit, it may not be cleared when the device enters auto ultra-deep power-down. This can be to ensure that an error can still be detected after an auto ultra-deep power-down program or erase operation. In this case, the write completion status bit may not be erased by a hardware reset or by exercising the RESET_ pin. However, it may be erased by a full power cycle, or if the ultra-deep power-down (e.g., 79h) command was used to enter UDPD mode.

The memory device may wake-up in single SPI mode even if the device was in QPI or octal mode when the memory device entered ultra-deep power-down. In this case, the system must wait for the device to return to the standby mode before normal command operations can be resumed. The exit ultra-deep power-down predetermined opcode (e.g., ABh), or a hardware reset command sequence can be used to wake up the device from ultra-deep power-down. This sequence can also be used to reset the device to its power on state without cycling power, which is another supported approach to exiting ultra-deep power-down mode. The hardware RESET_ pin can also be asserted in order to wake up the device from ultra-deep power-down. This option can also be used to reset the device to a state similar to the power on state without cycling power.

In particular embodiments, the memory device can be controlled to exit ultra-deep power-down by power cycling the device. For example, the VCC voltage or main power supply to the device can be discharged or otherwise disconnected, and then reapplied. Power-up circuitry can be employed to detect that VCC is at a sufficient level to operate the memory device as part of the powering up process. Thus, if the memory device was in the ultra-deep power-down prior to power cycling the device, once power is reapplied the memory device will have exited the ultra-deep power-down mode. In some cases, specified delay (e.g., $t_{PUW}$) or power-up device delay must elapse prior to the memory device accepting program or erase commands. This delay can ensure that the memory device has returned to the standby device, and may include ensuring that the appropriate internal supply levels (e.g., VDD) are at sufficient levels to carry out the given operations. However, in certain embodiments, host 102 need not explicitly wait for this full delay time as specified, and can instead begin sending new commands upon receiving an indication from memory device 104 that recovery from the reset operation has completed.

Figure 4:
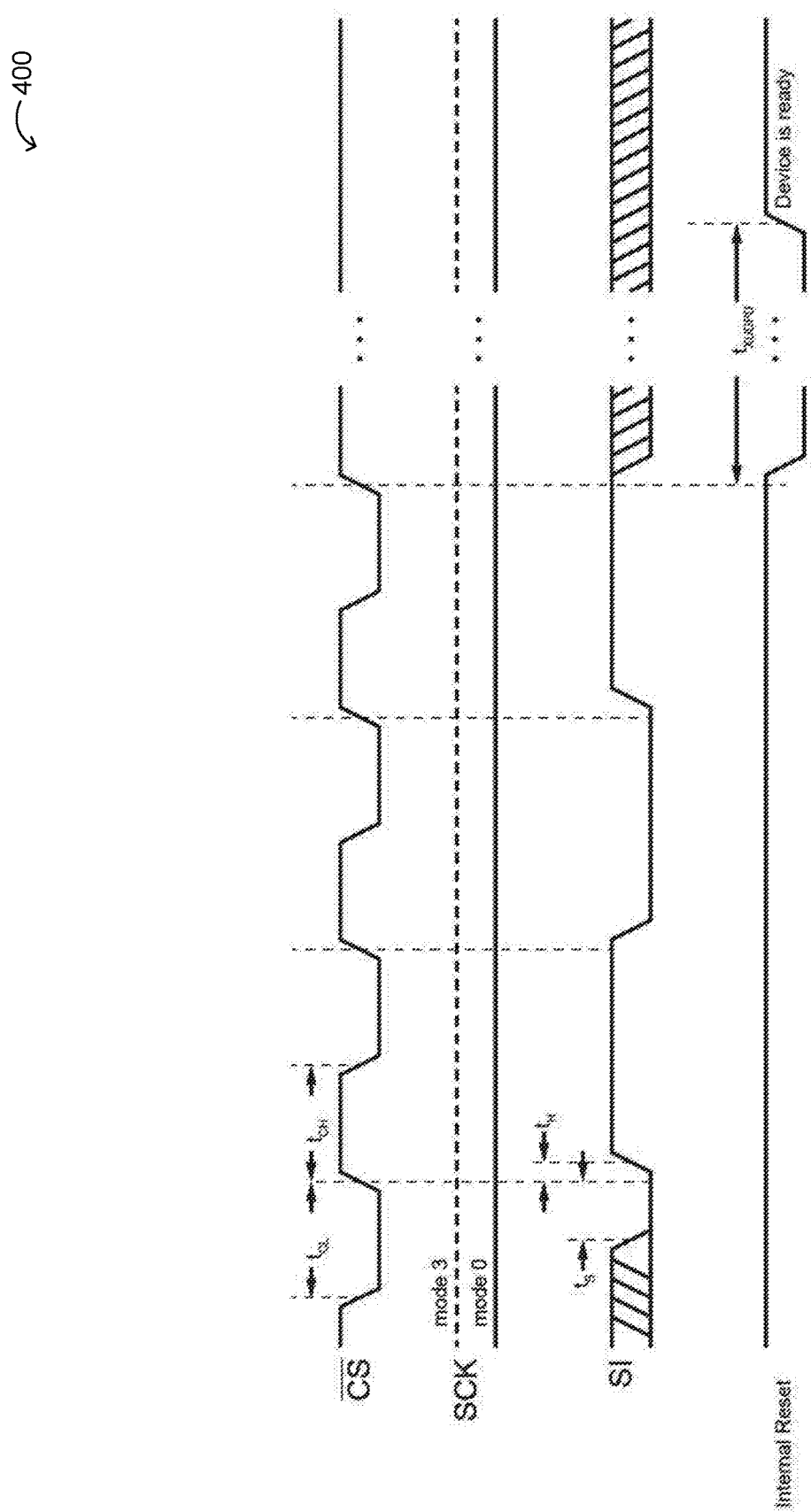
FIG. 4 is a waveform diagram of a first example hardware reset operation to exit ultra-deep power-down mode, in accordance with embodiments of the present invention.

Referring now to FIG. 4, shown is a waveform diagram 400 of a first example hardware reset operation to exit ultra-deep power-down mode, in accordance with embodiments of the present invention. This type of reset operation can also be referred to as a "JEDEC" hardware reset operation due to the specific command normally used in other types of resetting operations. In certain embodiments, this particular command sequence can be employed to exit ultra-deep power-down mode. The reset sequence may not use the SCK pin, and the SCK pin has to be held low (mode 0) or high (mode 3) through the entire reset sequence. This can prevent any confusion with a command, as no command bits are transferred (clocked). A reset/exit can be commanded when the data on the SI pin is 0101 on four consecutive positive edges of the CS_ pin with no edge on the SCK pin throughout.

This is a sequence where first CS_ is driven active low in order to select the device. Clock (SCK) can remain stable in either a high or low state. Also, SI can be driven low by the bus master (e.g., host 102), simultaneously with CS_ going active low. No SPI bus slave may drive SI during CS_ low before a transition of SCK (e.g., slave streaming output active is not allowed until after the first edge of SCK). Also, CS_ can be driven inactive. The slave may capture the state of SI on the rising edge of CS_. Such steps can be repeated 4 times, each time alternating the state of SI. After the fourth such CS_ pulse, the slave may trigger its internal reset. For example, SI can be low on the first CS_, high on the second, low on the third, high on the fourth. This provides a value of 5h, to distinguish from random noise. In addition, any activity on SCK during this time may halt the sequence and a reset may not be generated.

Figure 5:
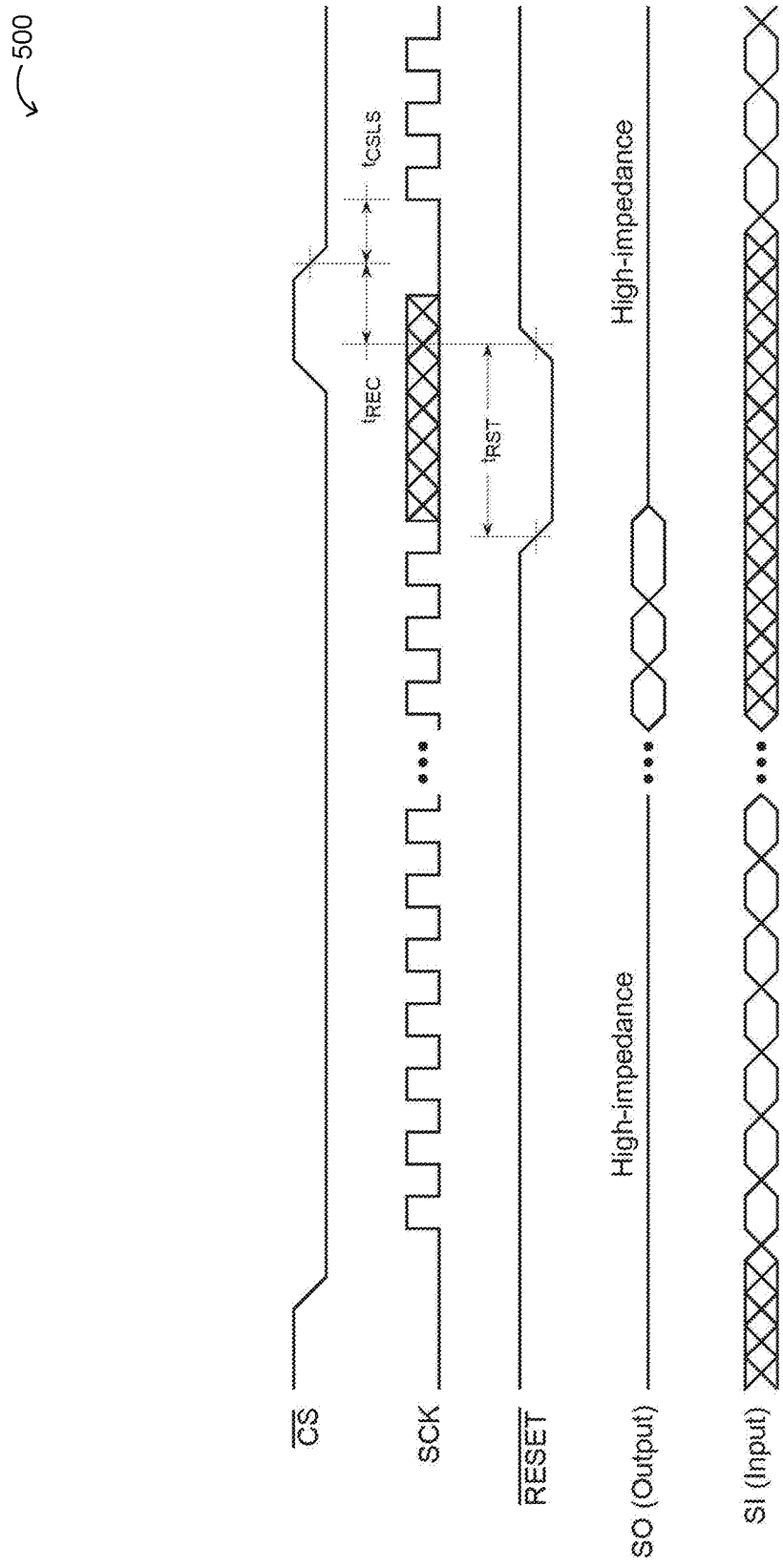
FIG. 5 is a waveform diagram of a second example hardware reset operation to exit ultra-deep power-down mode, in accordance with embodiments of the present invention.

Referring now to FIG. 5, shown is a waveform diagram 500 of a second example hardware reset operation to exit ultra-deep power-down mode, in accordance with embodiments of the present invention. In this example, the hardware reset pin can be used to wake-up the device to exit from the ultra-deep power-down mode. This sequence can also be used to reset the device to a state similar to the power on state without cycling power. The reset sequence in this case may not use any other pins. A low state on the reset pin (RESET_) may terminate the operation in progress and reset the internal state machine to an idle state. The memory device may remain in the reset condition as long as a low level is present on the RESET_ pin. Normal operation can resume once the RESET_ pin is brought back to a high level, and the device has recovered from the reset operation. The device can incorporate an internal power-on reset circuit, so there may be no restrictions on the RESET_ pin during power-on sequences.

Figure 6:
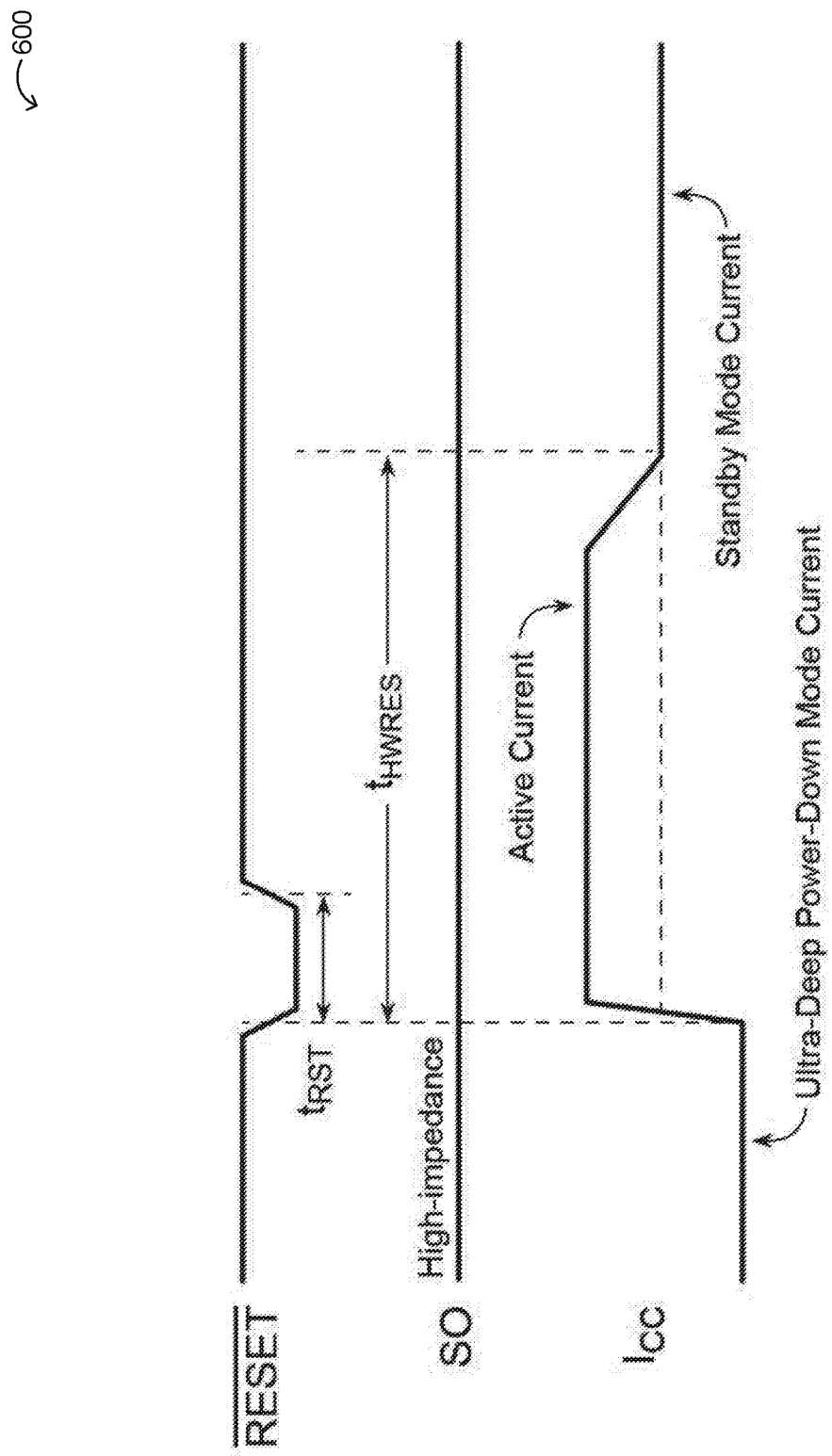
FIG. 6 is a waveform diagram including a power curve of the second example hardware reset operation, in accordance with embodiments of the present invention.

Referring now to FIG. 6, shown is a waveform diagram 600 including a power curve of the second example hardware reset operation, in accordance with embodiments of the present invention. As shown, the RESET_ pin being asserted can exit the memory device from the ultra-deep power-down mode. For example, the RESET_ pin may need to be asserted (e.g., held low) for a predetermined duration (e.g., $t_{RST}$). In response to the falling edge of the RESET_ pin, operating current the memory device may rise to an active current level in order to properly reset internal supplies (e.g., VDD as output from LDO regulator 218) and register states. This process can be completed within a specified hardware reset time (e.g., $t_{HWRES}$), and at that point the operating current can return to a standby mode current once the device enters the standby mode and is ready for normal operation. However, in certain embodiments, memory device 104 can indicate that it has recovered from (completed) the reset operation and is ready to accept new commands regardless of the specified hardware reset time (e.g., $t_{HWRES}$).

Figure 7:
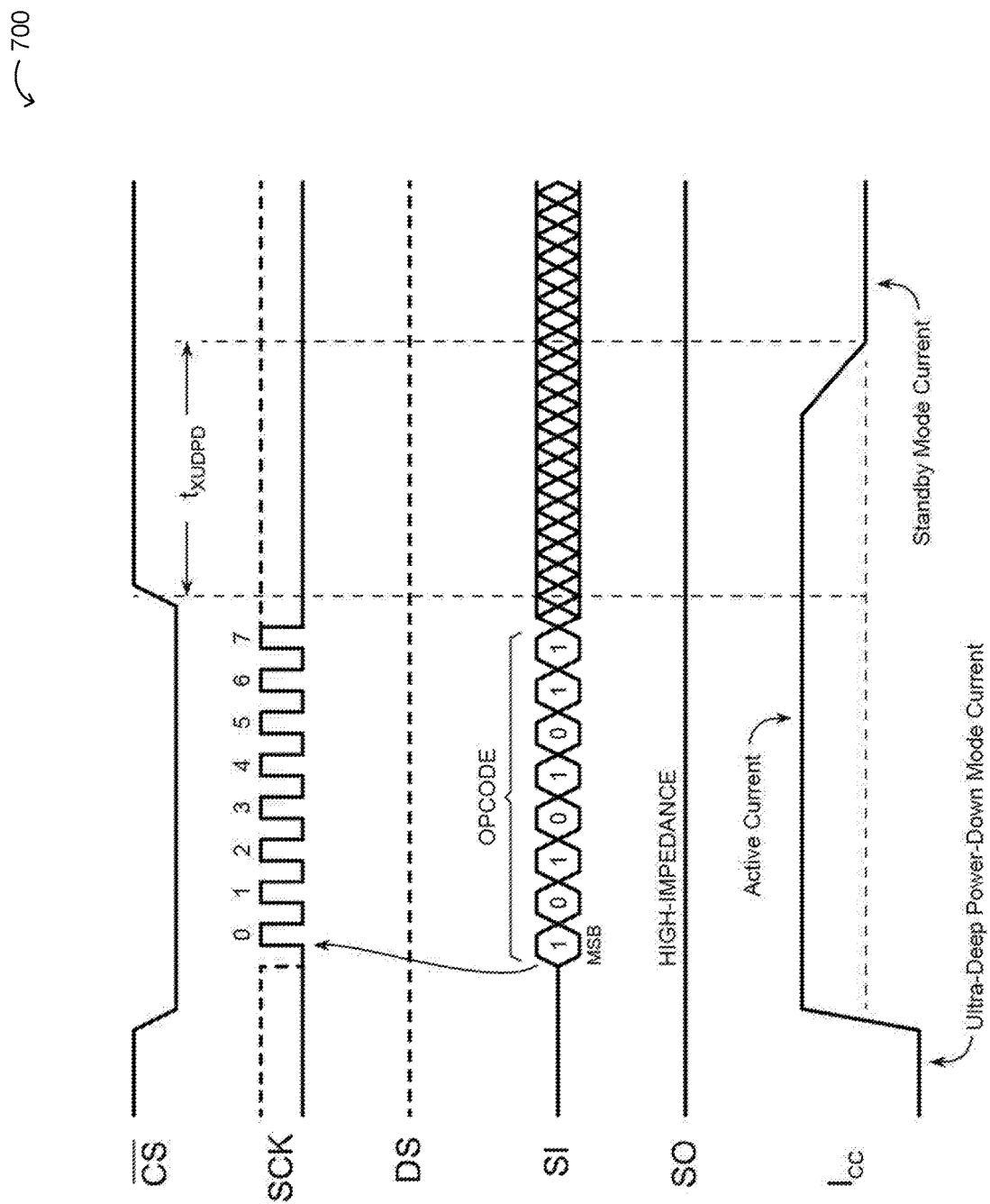
FIG. 7 is a waveform diagram of an example dedicated resume command to exit ultra-deep power-down mode, in accordance with embodiments of the present invention.

Referring now to FIG. 7, shown is a waveform diagram 700 of an example dedicated resume command to exit ultra-deep power-down mode, in accordance with embodiments of the present invention. This particular resume from power-down mode predetermined/dedicated command (e.g., opcode=ABh) may be the only instruction accepted to wake the device up from the power-down mode or ultra-deep power-down modes. All other commands may be ignored when the memory device is in the ultra-deep power-down mode. In this instruction command, after the CS_ pin is brought low, the "RES" or resume instruction can be applied. At the end of the instruction, the CS_ pin can be brought back high. The rising edge of the SCK clock number 7 (e.g., $8^{th}$ rising edge) can initiate the internal RES instruction. The memory device can become available for read and write instructions $t_{PUD}$ or $t_{XUDPD}$ after the $8^{th}$ rising edge of the SCK, as shown. However, in certain embodiments, memory device 104 can indicate that it has recovered from (completed) the reset operation and is ready to accept new commands regardless of the specified hardware reset time (e.g., $t_{XUDPD}$).

Figure 8:
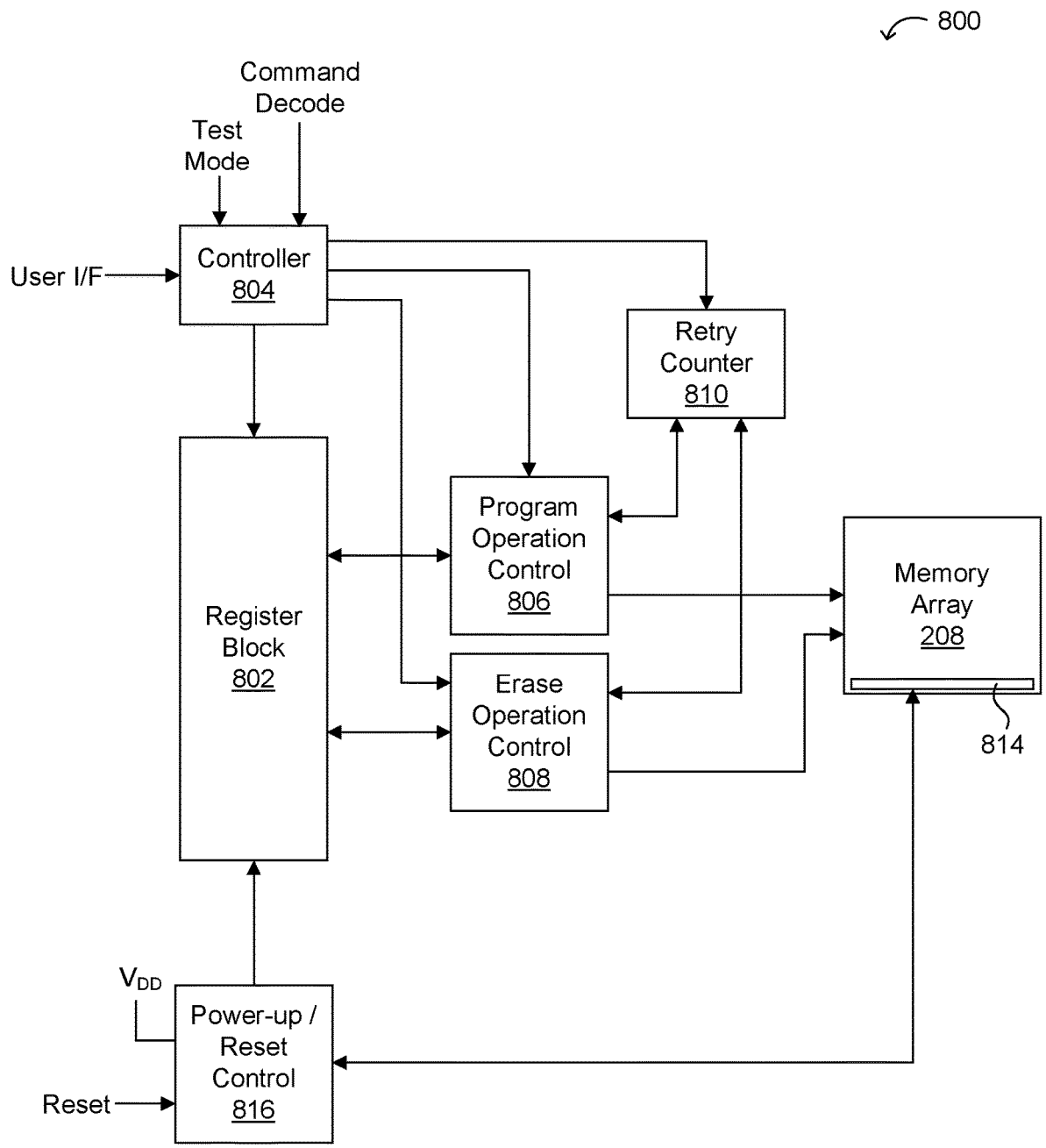
FIG. 8 is a schematic block diagram of an example register and reset operation control, in accordance with embodiments of the present invention.

Referring now to FIG. 8, shown is a schematic block diagram 800 of an example register and reset operation control, in accordance with embodiments of the present invention. For example, register block 802 can be implemented using SRAM. Register block 802 can provide algorithm and option variable selections to program operation control 806 and erase operation control 808. Register block 802 can also include the status register with a READY/BUSYB bit to indicate if the memory device is busy with a reset operation, or if the reset operation has completed and the memory device is ready to accept normal command. Controller 804 may determine and decode the received command, and can also control access to the register bits in register block 802. In addition, test modes (e.g., to determine operation distribution, etc.) can be used to override data in register block 802. Settings for register block 802 may be based on various algorithm and option variable or condition settings can be programmed on lot-by-lot or device-by-device basis, in some cases.

In addition, register block 802 can include an active reset polling enable bit that corresponds to each of the possible reset operations. When such an active reset polling enable bit is set for a given reset operation, memory device 104 can indicate when it has recovered from or otherwise completed that corresponding reset operation (e.g., exited the ultra-deep power-down mode). Otherwise, if the active reset polling enable bit is not set for a given reset operation, the memory device can make no such explicit indication of being recovered from that corresponding reset operation, and instead host 102 will have to wait until the specified recovery time has elapsed before providing new commands to the memory device. In this way, active reset polling can be enabled on a reset operation specific basis, and may be programmed by fuse or other non-volatile storage means. Further, active reset polling can be enabled for a given reset operation, or enabled/disabled for multiple reset operations at the same time, by way of a predetermined opcode or command. Such a command may be issued at any time when the memory device is in an active state, such as prior to initiating a reset operation.

In particular embodiments, active reset polling mode on a given reset operation may be implemented for one or more of the power-up or reset operations listed above, and need not be applied universally to all such reset operations. Each function or type of reset operation may be enabled/disabled by the user by setting a corresponding fuse or a bit (e.g., active reset polling enable bit) in a non-volatile status register (e.g., designated register data portion 814). For example, individual fuses or non-volatile status register bits can be designated for each reset operation/function, or groups of such functions (e.g., the hardware types of reset functions) may be enabled by the same bit. Thus, fuse or non-volatile status register selections can be applied to enable or disable active reset polling mode for any reset operation (e.g., power-up or power/VCC cycling operation, hardware reset command sequence, hardware reset pin assertion, predetermined SPI command to exit power-down modes).

In one example, power-up/reset control 816, which can receive a reset signal (e.g., via the RESET_ pin), can access designated register data portion 814 and read out data from that dedicated section of memory array 208. Power-up/reset control 816 can include, or otherwise interface with, regulator circuitry (e.g., LDO regulator 218). Designated register data portion 814 may alternatively be located outside of memory array 208. In any event, this accessed data that is associated with memory array 208 may then be loaded into register block 802. In this way, information specific to this device can be programmed into the memory core, and whenever the device is powered on (e.g., as determined by power-up/reset control 816) or otherwise reset, this data can be loaded into register block 802. This is because the memory core, including designated register data portion 814 may include non-volatile memory. Also, different applications-based information can be stored in non-volatile memory designated register data portion 814. In some cases, this dedicated portion of memory array may not be accessible to the user. However, some applications may allow access to these designated locations, such as in a test mode or via fuse programming.

Option variables that define conditions (e.g., pulse widths, voltage levels, current levels, etc.) for the program and erase operations of the selected operation algorithm may also be defined in register block 802. In addition, a maximum number of retry attempts, which may be embedded within one or more of the program/erase algorithms may also be stored in register block 802. For example, retry counter 810 may keep track of a number of attempts for a given program or erase operation, or a sequence of program and/or erase operations, as part of a selected program/erase operation algorithm. One or more of registers in register block 802 can also be configured as a status register including a READY/BUSYB bit that indicates if the memory device is busy with a reset operation, or has completed the recovery operation therefrom and is ready to accept normal commands on the memory device.

In one embodiment, a method of controlling memory device can include: (i) storing, in a non-volatile storage register, an active reset polling enable bit that corresponds to a reset operation; (ii) controlling execution of the reset operation on the memory device; (iii) determining when the reset operation has completed on the memory device; (iv) providing a reset recovery indication external to the memory device when the reset operation has completed and the active reset polling enable bit is set; and (v) receiving, by a command decoder, a command to be executed on the memory device in response to the reset recovery indication.

Figure 9:
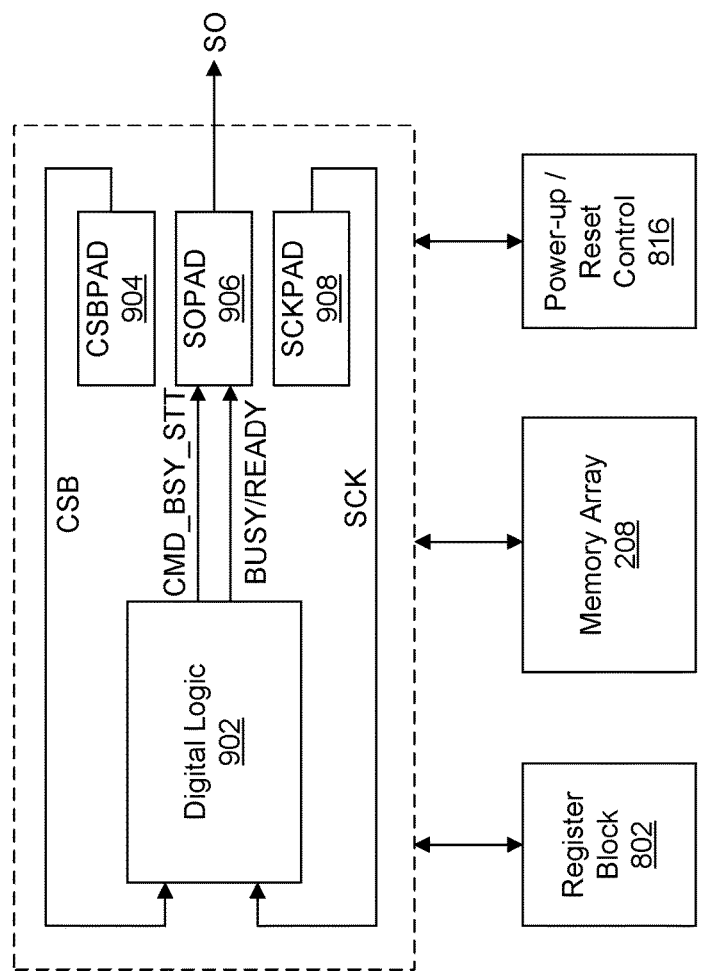
FIG. 9 is a schematic block diagram of example control for alerting as to completion of reset operations, in accordance with embodiments of the present invention.

Referring now to FIG. 9, shown is a schematic block diagram 900 of example control for alerting as to completion of (recovery from) reset operations, in accordance with embodiments of the present invention. In this example structure, memory array 208 and power-up/reset control 816 can interface with digital logic 902, CSBPAD 904 (e.g., receiving circuit and pad for chip select CS_ pin), SOPAD 906 (e.g., driving circuit and pad for serial output SO pin), and SCKPAD (e.g., receiving circuit and pad for serial clock SCK pin) 908. For example, digital logic 902 can operate with power up/reset control 816 for determining when a reset operation has completed, once the active reset polling mode has been enabled (e.g., via an active reset polling enable bit). CSBPAD 904 can include circuitry related to the chip select signal, and the chip select signal can be detected as asserted or de-asserted by digital logic 902. For example, the active reset polling mode can be enabled when the corresponding active reset polling enable bit is set.

SOPAD 906 can include circuitry related to the serial output signal, and the serial output signal can be controlled by signals from digital logic 902. For example, digital logic 902, which may include or be associated with one or more of command interface 222, controller 804, program/erase operation control 806/808, power-up/reset control 816, etc.) can determine whether a reset operation has sufficiently completed on the memory device, and may assert the serial output signal in order to indicate that the reset operation has completed (e.g., the memory device is ready to accept normal commands) when the active reset polling mode has been enabled. SCKPAD 908 can include circuitry related to the serial clock, and the serial clock signal can be provided to digital logic 902 to control the timing of the serial output signal at pin SO.

For example, the serial output signal can be asserted on a falling clock edge of SCK after determining that the given reset operation has completed on the memory device, such that the memory device is powered up and ready to accept normal commands. In another example, the serial output signal can be asserted in an asynchronous fashion once the internal reset operation has completed. Particular embodiments can also include an internal oscillator for use along with reset/recovery operations. In this case, an internal clock from this oscillator can be utilized to provide timing for driving the serial output signal/pin.

In certain embodiments, a separate command can be utilized to enable the active reset polling mode for a given reset operation, or to enable/disable the active reset polling mode for multiple reset operations. For example, a predetermined opcode (e.g., opcode 0x25h) can be employed to indicate activation of this command. In order to clock in this predetermined opcode (25h), 8 or 16 SCK cycles may be utilized. For example, the first 8 SCK clocks can be used to enter opcode 25h, and one or more additional SCK cycles can be utilized to enable SO (e.g., to drive the serial output signal). In this case, 9 SCK cycles may be utilized, and because the SPI protocol may operate in groups of 8 SCK cycles, a dummy byte can also be added.

In particular embodiments, the status register (e.g., in register block 802) can be updated when the reset operation is complete and the memory device is ready to accept commands (e.g., program/erase, read, etc.). In addition, when the active reset polling mode is enabled (e.g., via opcode 25h), the completion status of the reset operation may also be synchronously or asynchronously passed to the SO pin. Thus when enabled, the internal logic (e.g., digital logic 902) can send appropriate "READY/BUSYB" status bit to the SO pin directly when the reset cycle or execution completes, and may trigger an SO pin change (e.g., from high to low, from low to high, from high impedance to low impedance, etc.).

In addition, a READY/BUSYB status bit can also be updated and available through a standard status register read and/or polling command irrespective of enabling of the active reset polling mode as described herein. In this fashion, backwards compatibility can be maintained between older generations of serial memory devices, as well as providing support of other industry standards. Thus, once a power-up/reset operation has completed, the status register (e.g., in register block 802) can be updated, and in addition the serial output pin (SO) may be appropriately driven to indicate completion of execution of the reset operation on the memory device when the active reset polling mode has been enabled for that reset operation. In this way, the host (e.g., 102) need not perform periodic polling of the memory device (e.g., 104) if active reset polling has been enabled; however, the host still may have the option of performing such periodic polling.

Figure 10:
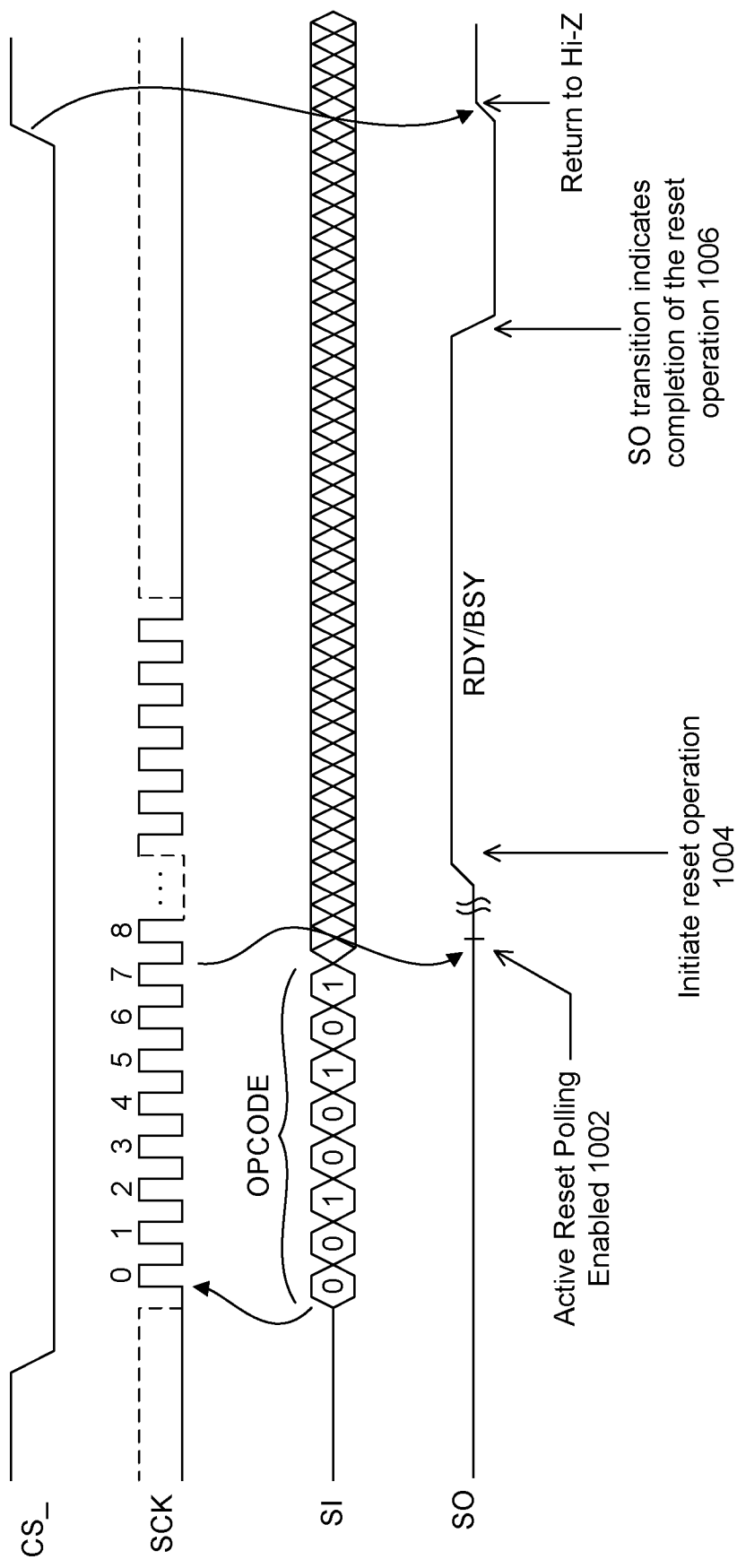
FIG. 10 is a waveform diagram of an example alerting as to completion of a reset operation, in accordance with embodiments of the present invention.

Referring now to FIG. 10, shown is a waveform diagram of a first example alerting as to completion of a reset operation, in accordance with embodiments of the present invention. In this particular example of an active reset polling mode or operation, the chip select signal can be activated in order to select the memory device. The clock SCK can be toggled to capture the opcode provided on the serial input signal. For example, each rising edge of SCK can capture a bit in a bit string from a most significant bit to a least significant bit of the opcode. Thus, opcode 00100101=25h can be received and matched against a predetermined opcode in order to enable active reset polling operation or mode. Other bit strings can be provided in order to selectively enable or disable active reset polling for each given reset operation. In this particular example, the active reset polling operation may be enabled at 1002. As discussed above, the active reset polling mode can be enabled/disabled for each type of reset operation by way of fuses or other non-volatile registers, and the particular command shown here represents one way that a user can interface with the memory device in order to program such a register.

When the memory device enters a reset operation at 1004, the memory device may have its output in a high impedance state, but SO may be brought high by way of an external pull-up resistor to a power supply. Once the internal startup sequence in the memory device begins, the device can output the READY/BUSYB signal on the SO (I/O$_1$) line. At this stage this signal may be high (BUSY). Once the internal startup sequence in the memory device has sufficiently completed, the value of the READY/BUSYB signal to can be changed to be low (READY) and may pull the SO (I/O$_1$) line low at 1006. This may be the signal to the host device that the memory device is ready to receive commands. Also, the states on the serial or other output signal that indicates that the reset operation is complete can be any suitable states. In the example of FIG. 10, the serial output signal may remain in a high impedance state during the reset operation, and can be driven to a low impedance state (0 or 1) once the reset operation is complete. As another example, the serial clock may not continue to clock after input of the opcode. In this case, the output driven on the serial output signal can be asynchronous in that the signal can be provided without reference to a particular serial clock edge.

Because non-volatile storage can be employed to enable/disable active reset polling for given reset operations, the memory device can be aware at power-up whether the function is enabled. The associated active reset polling enable bits can thus be user rewritable, one time programmable, and/or programmed as part of another command (e.g., a full chip erase command). Setting or clearing a fuse bit or a non-volatile status register bit for active reset polling can either be a dedicated command for this function, or may utilize existing commands that are used to set or clear other status register bits. In other cases, active reset polling can be enabled as a permanent option for a memory device such that the function is always enabled for that device, such as by way of a hidden fuse not programmable by a user, or a metal option. However, in certain embodiments, user programmable non-volatile memory bits can be employed to enable/disable active reset polling for each type of reset operation. In this way, relatively long timeouts that are currently specified in the data sheets as to recovery from reset operations, which are typically specified as the overall worst case numbers, can be effectively reduced for improved system performance.

Particular embodiments support various mechanisms for determining when the memory device has recovered from a reset operation and is ready to receive commands. Power-reset control 816 can include power-on reset circuits and/or brownout detectors for detecting that the supply voltage (e.g., VCC) and various internal voltage rails (e.g., VDD) have reached a specific minimum operation levels. In addition, state machines and/or internal programmable controllers may proceed through a startup sequence where internal registers are set to their startup or default values, including reading fuses/trim bits/calibration values from non-volatile memory (e.g., 814). This process can include verifying that internal voltages have reached the correct levels prior to executing the startup sequence. At a predefined point near the end (or at the end) of this startup sequence, the memory device may be deemed ready to receive commands, and can signal that by changing the output level of one of the I/O lines, as discussed above. In some cases, the memory device can signal when it is ready to receive a program or erase command (or any other command), and/or may provide an indication that it is ready to accept a read command (which can occur earlier).

Figure 11:
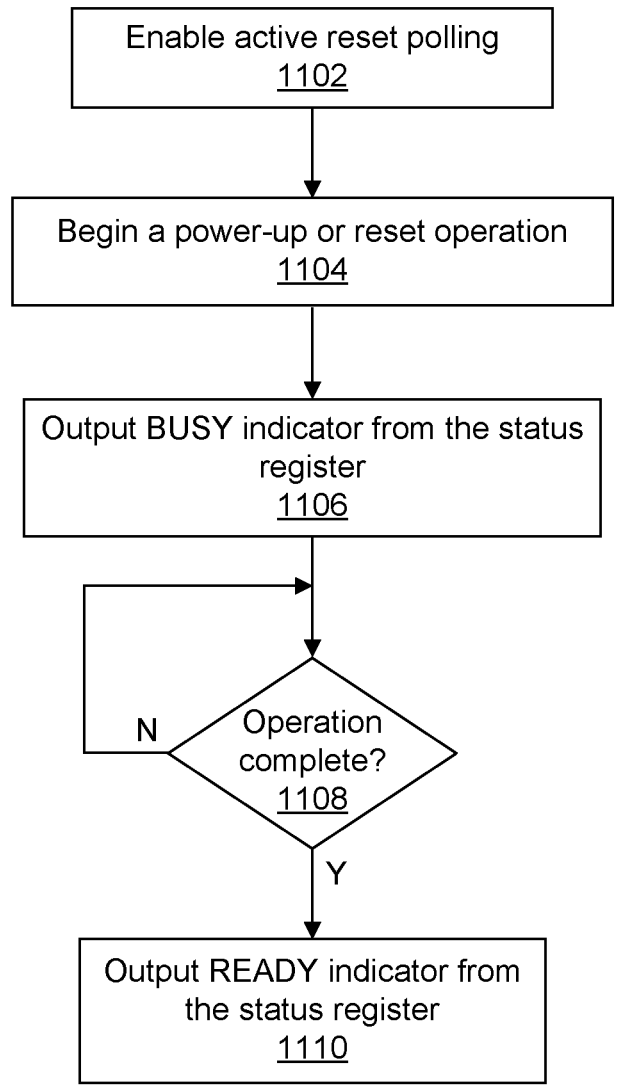
FIG. 11 is a flow diagram of an example method of alerting as to completion of a reset operation with register updating, in accordance with embodiments of the present invention.

Referring now to FIG. 11, shown is a flow diagram 1100 of an example method of alerting as to completion of a reset operation with register updating, in accordance with embodiments of the present invention. At 1102, the active reset polling mode can be enabled (e.g., in register block 802) for a given reset operation. For example, this may be set in a non-volatile register portion 814, via fuse, etc., and may be programmed by way of a predetermined opcode. At 1104, a power-up or reset operation (e.g., exiting from ultra-deep power-down or deep power-down mode) can begin. At 1106, the busy indicator from the status register can be output from the memory device. For example, the output pin can be pulled high or remain in a high impedance state. The opcode or other appropriate program that enables active reset polling can be supplied in advance of even entering the ultra-deep power-down or deep power-down mode from which the device may ultimately exit as part of a reset operation. In one example, the active reset polling mode can remain enabled for any subsequent reset operations, until explicitly disabled (e.g., via non-volatile register programming).

In particular embodiments, once the active reset polling operation has been enabled (e.g., via a corresponding active polling enable bit), the memory device can provide an indication when the memory device has recovered from the reset operation, and without the host 102 having to wait a full specified recovery time. Once the reset operation is complete at 1108, the ready indicator signal can be output at 1110. For example, once a power-up or reset operation has completed execution and the device has effectively recovered from the reset operation, the output signal can change from a logic level low to a logic level high (e.g., 0 to 1), or from a logic level high to a logic level low (e.g., 1 to 0), in order to indicate that the operation is complete. In addition, one or more registers (e.g., a status register in register block 802) can also have a READY/BUSYB status bit written along with activation of the output signal, in order to indicate completion of the self-timed operation.

In this way, particular embodiments can reduce the wake-up time of a memory system to the minimum time the memory device actually requires to complete or emerge from a reset operation, instead of waiting a worst case specified timeout period that may be determined by characterization of a group of memory devices. This can be of increased importance for new devices where the actual startup time may be increased in order to decrease peak current consumption, as compared to current devices.

This approach can reduce the power-up wait period from a worst case datasheet specified value to the actual timeout that may be required for each individual memory device. In this way, certain embodiments can support a variety of methods, circuits, mechanisms and/or structures that provide notification of the memory device completing the reset operation. While the above examples include circuit, operational, methods, and structural implementations of certain memory devices, one skilled in the art will recognize that other technologies and/or structures can be used in accordance with embodiments. For example, other opcodes, as well as other types of interfaces (e.g., parallel interfaces, DQ signaling, etc.) can be utilized in certain embodiments. Further, one skilled in the art will recognize that other device circuit arrangements, architectures, elements, and the like, may also be used in accordance with embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A memory device, comprising:
a) a non-volatile storage register configured to store an active reset polling enable bit that corresponds to a reset operation;
b) a reset control circuit coupled to the non-volatile storage register, and being configured to control execution of the reset operation on the memory device;
c) an output circuit configured to transition a signal on an output pin from a high impedance state to a first low impedance state in response to the reset operation being initiated on the memory device and the active reset polling enable bit being set;
d) an operation completion indicator configured to automatically output a reset recovery indication from the memory device when the reset operation has completed and the active reset polling enable bit is set, wherein the reset recovery indication comprises a transition of the signal on the output pin from the first low impedance state to a second low impedance state;
e) a command decoder configured to receive a command to be executed on the memory device in response to the reset recovery indication; and
f) a status register configured to be written to along with the reset recovery indication to indicate that the reset operation has completed execution on the memory device, wherein the status register is also configured to store the active reset polling enable bit.

2. The memory device of claim 1, wherein the non-volatile storage register is configured to be programmed by matching a received opcode against a predetermined opcode.

3. The memory device of claim 1, wherein the output circuit is configured to maintain the signal on the output pin in the second low impedance state while a chip select signal is asserted.

4. The memory device of claim 3, wherein the output circuit is configured to transition the signal on the output pin from the second low impedance state to the high impedance state in response to the chip select signal being deasserted.

5. The memory device of claim 1, further comprising a digital logic circuit configured to output a status bit from the status register to provide the reset recovery indication.

6. The memory device of claim 1, wherein the reset operation comprises an exit from a power-down mode.

7. The memory device of claim 1, wherein the reset operation comprises a power-up operation.

8. The memory device of claim 1, wherein the operation completion indicator comprises a power-on reset circuit configured to detect whether an internal supply voltage is greater than a predetermined supply voltage level.

9. The memory device of claim 1, wherein the reset control circuit is configured to copy the contents of the non-volatile storage register into the status register, wherein the status register is a volatile memory.

10. The memory device of claim 1, further comprising a plurality of non-volatile storage registers, each having an active reset polling enable bit that corresponds to a different reset operation.

11. A memory system, comprising the memory device of claim 1, and further comprising:
a) a host configured to receive the reset recovery indication from the memory device prior to a specified recovery time; and
b) a serial peripheral interface (SPI) coupled between the host and the memory device.

12. A method of controlling a memory device, the method comprising:
a) storing, in a non-volatile storage register, an active reset polling enable bit that corresponds to a reset operation;
b) controlling execution of the reset operation on the memory device;
c) transitioning, by an output circuit, a signal on an output pin from a high impedance state to a first low impedance state in response to the reset operation being initiated on the memory device and the active reset polling enable bit being set;
d) determining when the reset operation has completed on the memory device;
e) automatically outputting a reset recovery indication from the memory device when the reset operation has completed and the active reset polling enable bit is set, wherein the reset recovery indication comprises a transition of the signal on the output pin from the first low impedance state to a second low impedance state;
f) receiving, by a command decoder, a command to be executed on the memory device in response to the reset recovery indication; and
g) writing a status register along with the reset recovery indication to indicate that the reset operation has completed execution on the memory device, wherein the status register is also configured to store the active reset polling enable bit.

13. The method of claim 12, further comprising programming the non-volatile storage register by matching a received opcode against a predetermined opcode.

14. The method of claim 12, wherein the providing the reset recovery indication comprises maintaining the signal on the output pin of the memory device in the second low impedance state while a chip select signal is asserted, and transitioning the signal from the second low impedance state to the high impedance state in response to the chip select signal being deasserted.

15. The method of claim 12, further comprising outputting a status bit from the status register to provide the reset recovery indication.

16. The method of claim 12, wherein the reset operation comprises exiting from a power-down mode.

17. The method of claim 12, wherein the reset operation comprises a power-up operation.

18. The method of claim 12, wherein the determining when the reset operation has completed comprises detecting, by a power-on reset circuit, whether an internal supply voltage is greater than a predetermined supply voltage level.

19. The method of claim 12, wherein the determining when the reset operation has completed comprises copying the contents of the non-volatile storage register into the status register, wherein the status register is a volatile memory.

20. The method of claim 12, further comprising programming a plurality of non-volatile storage registers, each having an active reset polling enable bit that corresponds to a different reset operation.

\* \* \* \* \*